(12) United States Patent
Robertson et al.

(10) Patent No.: US 8,488,007 B2
(45) Date of Patent: Jul. 16, 2013

(54) METHOD TO ESTIMATE SEGMENTED MOTION

(75) Inventors: Mark Robertson, Cupertino, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 12/689,823

(22) Filed: Jan. 19, 2010

(65) Prior Publication Data

US 2011/0176013 A1     Jul. 21, 2011

(51) Int. Cl.
*H04N 5/228*     (2006.01)

(52) U.S. Cl.
USPC ........ 348/208.4; 348/155; 348/169; 382/107; 382/232; 382/236; 382/278

(58) Field of Classification Search
USPC ............... 348/208.4, 155, 169; 382/107, 236, 382/232, 278
See application file for complete search history.

(56) References Cited

U.S. PATENT DOCUMENTS

| | | | |
|---|---|---|---|
| 5,005,078 A | 4/1991 | Gillard | |
| 5,223,932 A * | 6/1993 | Thomas et al. | ............... 348/571 |
| 5,557,684 A | 9/1996 | Wang et al. | |
| 5,594,504 A * | 1/1997 | Ebrahimi | ................. 375/240.16 |
| 5,635,994 A | 6/1997 | Drexler et al. | |
| 5,642,166 A | 6/1997 | Shin et al. | |
| 5,682,205 A | 10/1997 | Sezan et al. | |
| 5,717,470 A | 2/1998 | Jung | |
| 5,818,969 A | 10/1998 | Astle | |
| 5,940,145 A | 8/1999 | Burl | |
| 6,057,892 A | 5/2000 | Borer | |
| 6,075,818 A | 6/2000 | Thomson | |
| 6,278,736 B1 | 8/2001 | De Haan et al. | |
| 6,385,245 B1 * | 5/2002 | De Haan et al. | ......... 375/240.16 |
| 6,418,166 B1 | 7/2002 | Wu et al. | |
| 6,473,462 B1 | 10/2002 | Chevance et al. | |
| 6,658,059 B1 | 12/2003 | Lu et al. | |
| 7,170,934 B2 | 1/2007 | Linzer | |
| 7,260,148 B2 | 8/2007 | Sohm | |
| 7,349,583 B2 | 3/2008 | Kumar et al. | |
| 7,620,269 B1 | 11/2009 | Nandy | |

(Continued)

FOREIGN PATENT DOCUMENTS

EP     0720382 B1     7/1996
WO     87/05769       9/1987

(Continued)

OTHER PUBLICATIONS

Su et al., "Robust Global Motion Estimation From Coarsely Sampled Motion Vector Fields;" Proceedings of SPIE, vol. 5022, pp. 98-101, Published Jun. 30, 2003.

(Continued)

*Primary Examiner* — Antoinette Spinks
(74) *Attorney, Agent, or Firm* — Haverstock & Owens LLP

(57) ABSTRACT

A method to estimate segmented motion uses phase correlation to identify local motion candidates and a region-growing algorithm to group small picture units into few distinct regions, each of which has its own motion according to optimal matching and grouping criteria. Phase correlation and region growing are combined which allows sharing of information. Using phase correlation to identify a small number of motion candidates allows the space of possible motions to be narrowed. The region growing uses efficient management of lists of matching criteria to avoid repetitively evaluating matching criteria.

23 Claims, 8 Drawing Sheets

Many 4x4 sub-blocks | After one stage of merging: fewer regions | After second stage of merging: fewer regions | Final: Two regions, each with own MV

U.S. PATENT DOCUMENTS

| | | | |
|---|---|---|---|
| 7,751,482 B1 | 7/2010 | Srinivasan et al. | |
| 8,000,392 B1* | 8/2011 | Krupiczka et al. | 375/240.16 |
| 8,155,452 B2 | 4/2012 | Minear | |
| 2005/0025342 A1 | 2/2005 | Lee et al. | |
| 2005/0094852 A1 | 5/2005 | Kumar et al. | |
| 2005/0105618 A1 | 5/2005 | Booth et al. | |
| 2005/0135484 A1 | 6/2005 | Lee et al. | |
| 2005/0242568 A1 | 11/2005 | Long et al. | |
| 2005/0243921 A1 | 11/2005 | Au et al. | |
| 2005/0270486 A1 | 12/2005 | Teiwes et al. | |
| 2006/0056513 A1 | 3/2006 | Shen et al. | |
| 2006/0056708 A1 | 3/2006 | Shen et al. | |
| 2006/0083407 A1 | 4/2006 | Zimmermann et al. | |
| 2006/0110038 A1* | 5/2006 | Knee et al. | 382/173 |
| 2006/0188158 A1* | 8/2006 | Thiruvenkadam et al. | 382/171 |
| 2006/0280248 A1 | 12/2006 | Kim et al. | |
| 2007/0092006 A1 | 4/2007 | Malayath | |
| 2007/0121728 A1 | 5/2007 | Wang et al. | |
| 2007/0154103 A1 | 7/2007 | Au et al. | |
| 2007/0183504 A1 | 8/2007 | Hoffman et al. | |
| 2007/0217515 A1 | 9/2007 | Wang et al. | |
| 2007/0280352 A1* | 12/2007 | Mitchell | 375/240.12 |
| 2007/0286286 A1 | 12/2007 | Heng et al. | |
| 2007/0291849 A1* | 12/2007 | Lainema | 375/240.18 |
| 2007/0297512 A1 | 12/2007 | Lee et al. | |
| 2007/0297513 A1* | 12/2007 | Biswas et al. | 375/240.16 |
| 2008/0019611 A1 | 1/2008 | Larkin et al. | |
| 2008/0165855 A1* | 7/2008 | Wang et al. | 375/240.16 |
| 2008/0247466 A1* | 10/2008 | Wang et al. | 375/240.16 |
| 2008/0309769 A1 | 12/2008 | Albu et al. | |
| 2009/0010568 A1* | 1/2009 | Nakagami et al. | 382/299 |
| 2009/0310872 A1* | 12/2009 | Sibiryakov et al. | 382/232 |

FOREIGN PATENT DOCUMENTS

| | | |
|---|---|---|
| WO | 92/19068 | 10/1992 |
| WO | 95/24096 | 9/1995 |
| WO | 96/30873 A1 | 10/1996 |
| WO | 9937087 A1 | 7/1999 |

OTHER PUBLICATIONS

Sanjeev Kumar et al., "Global Motion Estimation in Frequency and Spatial Domain" Department of Electrical and Computer Engineering, UCSD, La Jolla, California, 2004.

Loy Hui Chein et al., "Robust Motion Estimation for Video Sequences Based on Phase-Only Correlation" Graduate School of Information Sciences, Tohoku University, Japan, Signal and Image Processing Aug. 23-25, 2004, Honolulu, Hawaii, USA pp. 441-446.

T. Vlachos, "Simple method for estimation of global parameters using sparse translation motion vector fields," Electronics Letters Jan. 8, 1998 vol. 34 No. 1.

Michael J. Black, "Combining Intensity and Motion for Incremental Segmentation and Tracking Over Long Image Sequences", National Aeronautics and Space Administration (NGT-20749 and NASA RTOP 506-47), by ONR Grant N00014-91-J-1577, and by a grant from the Whitaker Foundation, pp. 485-493, Department of Computer Science, Yale University, P.O. Box 2158 Yale Station, New Haven, CT 06520-2158, USA, 1992.

Hideki Yamauchi et al., "An 81 MHz, 1280×720pixels×30frames/s MPEG-4 Video/Audio Codec Processor", 2005, ISSCC 2005/ Session 7/ Multimedia Processing/ 7.2, pp. 97-130-131-589, Sanyo Electric, Gifu, Japan.

Hye-Yeon Cheong Tourapis et al., Fast Motion Estimation Within the H.264 CODEC, 2003, pp. III-517-III-520, IEEE, Corporate Research, Thomas multimedia Inc., 2 Independence Way, Princeton, NJ 08540, U.S.A.

Gagan B. Rath et al., "Iterative Least Squares and Compression Based Estimations for a Four-Parameter Linear Global Motion Compensation," IEEE Transactions on circuits and systems for video technology, vol. 9, No. 7, pp. 1075-1099, Department of Electrical Communication Engineering, Indian Institute of Science, Bangalore-560012, India, Publisher Item Identifier S 1051-8215(99)08175-6, 1999.

Til Aach and Andr'e Kaup, "Disparity-Based Segmentation of Stereoscopic Foreground/Background Image Sequences," <http://www.lfb.rwth-aachen.de/files/publications/old/AAC94a.pdf>, Dec. 15, 2006.

Alp Erturk and Sarp Erturk, "Unsupervised Segmentation of Hyperspectral Images Using Modified Phase Correlation," <http://kulis.kou.edu.tr/pub/grs106_mpc.pdf>, Oct. 4, 2006.

Yan Yang Hemami S.S, "Rate-Distortion-Based Combined Motion Estimation and Segmentation," <http://ieeexplore.ieee.org/xpl/freeabs_all.jsp?arnumber=727401>, Oct. 4, 1998.

Chang M.M et al., "Simultaneous Motion Estimation and Segmentation," <http://ieeexplore.ieee.org/xpl/freeabs_all.jsp?arnumber=623196>, Sep. 1997.

Gharavi H et al., "3-D Segmentation and Motion Estimation of Range Data for Crash Prevention," <http://ieeexplore.ieee.org/search/freesrchabstract.jsp?arnumber=4290145&isnumber=4290055&punumber=4290054&k2dockey=4290145@ieeecnfs&query=((~~motion+estimation~~+and+segmentation+and+~~region+growing~~))%3Cin%3Emetadata&pos=0, Jun. 13, 2007.

K. Takita, et al. "High-Accuracy Subpixel Image Registration of Multiple Frames of Video Images," Proc. Spie Conf. Vis. Comm. And Image Proc., vol. 3653, pp. 371-382, 1999.

Liang, Yi, "Phase-Correlation Motion Estimation," <http://scien.stanford.edu/class/ee392j/projects/projects/liang_report.pdf>, 2000.

Szeliski, R., "Video Mosaics for Virtual Environments," <http://www.cs.bu.edu/groups/ivc/exam/papers/szeliski.pdf>, Mar. 1996.

H. Foroosh et al., "Extension of Phase Correlation to Subpixel Registration," IEEE Trans. on Image Proc. vol. 11, No. 3, Mar. 2002, pp. 188-200.

G.A. Thomas, "Television Motion Measurement for DATV and Other Applications," BBC Res. Dept. Rep., No. 19887/11, 1987.

I.E. Abdou, "Practical Approach to the Registration of Multiple Frames of Video Images," Proc. SPIE Conf. Vis. Comm. and Image Proc., vol. 3653, pp. 371-382, 1999.

V. Argyriou and T. Vlachos, "A Study of Sub-Pixel Motion Estimation Using Phase Correlation," British Machine Vision Conference, 2006.

L.H. Chien and T. Aoki, "Robust Motion Estimation for Video Sequences Based on Phase-Only Correlation," Proc. IASTED Int. Conf. on Signal and Image Processing, 2004.

M.A. Fischler and R.C. Bolles, "Random Sample Consensus: A Paradigm for Model Fitting with Applications to Image Analysis and Automated Cartography," Communications of the ACM, 24(6):381-395, Jun. 1981.

\* cited by examiner

US 8,488,007 B2

METHOD TO ESTIMATE SEGMENTED MOTION

FIELD OF THE INVENTION

The present invention relates to the field of video processing. More specifically, the present invention relates to simultaneously performing motion estimation and segmentation.

BACKGROUND OF THE INVENTION

Two common problems in video analysis are motion estimation and segmentation. Motion estimation is necessary for a multitude of tasks in video processing. Knowledge of segmentation, while not required for all video applications is able to provide additional information and enable higher-level understanding of video content.

Motion estimation and segmentation have been studied by many researchers. Often the two are addressed independently, which is non-optimal. Often, the two are addressed by complicated theoretical means, which is able to lead to unwieldy implementations. There are numerous methods, ranging from block-based sum-of-absolute-differences to probabilistic methods based on Bayesian estimation.

SUMMARY OF THE INVENTION

A method to estimate segmented motion uses phase correlation to identify local motion candidates and a region-growing algorithm to group small picture units into few distinct regions, each of which has its own motion according to optimal matching and grouping criteria. Phase correlation and region growing are combined which allows sharing of information. Using phase correlation to identify a small number of motion candidates allows the space of possible motions to be narrowed. The region growing uses efficient management of lists of matching criteria to avoid repetitively evaluating matching criteria.

In one aspect, a method of estimating motion in a video on a device comprises performing phase correlation on the video to identify local motion candidates using a processor and merging regions of the video to generate motion segmentation using the processor. Performing the phase correlation further comprises computing a phase correlation surface and identifying biggest peaks from the phase correlation surface, wherein indices of the peaks correspond to possible motions. Merging regions further comprises assigning the local motion candidates according to results from the phase correlation, calculating a set of Sum of Absolute Differences for each sub-block of blocks of the video, including chroma components, initializing region merging and merging regions until there are no regions to be merged. The set of Sum of Absolute Differences are stored in an array. Initializing region merging further comprises generating a linked list of the regions with each sub-block assigned to a region of the regions, maintaining a Sum of Absolute Differences array for each of the regions, assigning a motion vector of each of the regions in the linked list according to a smallest Sum of Absolute Differences in the region's Sum of Absolute Differences array and assigning an area of each region to be a value representing a single sub-block. Merging regions further comprises for each region in the regions and for each neighboring region, determining if the region and the neighboring region are able to be merged to form a single region. Determining if the region and the neighboring region are able to be merged further comprises computing a combined Sum of Absolute Differences array by summing the Sum of Absolute Differences arrays of the region and the neighboring region, determining a minimum Sum of Absolute Differences in the combined Sum of Absolute Differences array and if the minimum Sum of Absolute Differences is less than a first minimum of the Sum of Absolute Differences of the region, a second minimum of the Sum of Absolute Differences of the neighboring region, and a parameter combined, then merge the region and the neighboring region. Merging the region and the neighboring region comprises adding the neighboring region to the region, assigning the Sum of Absolute Differences array according to the summed Sum of Absolute Differences arrays previously computed, assigning a motion for the region according to a candidate and removing the neighboring region from a region list. In addition to the Sum of Absolute Differences, a spatial smoothness term and a penalty value are used. The method further comprises using global motion candidates to assist in the motion estimation. The method further comprises using spatial neighbor candidates to assist in the motion estimation. The method further comprises using temporal neighbor candidates to assist in the motion estimation. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a system for estimating motion in a video on a device comprises a phase correlation module for performing phase correlation on the video to identify local motion candidates using a processor and a region merging module for merging regions of the video to generate motion segmentation using the processor. The phase correlation module is further for computing a phase correlation surface and identifying biggest peaks from the phase correlation surface, wherein indices of the peaks correspond to possible motions. The region merging module is further for assigning the local motion candidates according to results from the phase correlation, calculating a set of Sum of Absolute Differences for each sub-block of blocks of the video, including chroma components, initializing region merging and merging regions until there are no regions to be merged. The set of Sum of Absolute Differences are stored in an array. Initializing region merging further comprises generating a linked list of the regions with each sub-block assigned to a region of the regions, maintaining a Sum of Absolute Differences array for each of the regions, assigning a motion vector of each of the regions in the linked list according to a smallest Sum of Absolute Differences in the region's Sum of Absolute Differences array and assigning an area of each region to be a value representing a single sub-block. Merging regions further comprises for each region in the regions and for each neighboring region, determining if the region and the neighboring region are able to be merged to form a single region. Determining if the region and the neighboring region are able to be merged further comprises computing a combined Sum of Absolute Differences array by summing the Sum of Absolute Differences arrays of the region and the neighboring region, determining a minimum Sum of Absolute Differences in the combined Sum of Absolute Differences array and if the minimum Sum of Absolute Differences is less than a first minimum of the Sum of Absolute Differences of the region, a second minimum of the Sum of Absolute Differences of the neighboring region, and a parameter combined, then merge the region and the neighboring region. Merging the region and the neighboring region comprises adding the neighboring region to the region, assigning the Sum of Absolute Differences array according to the summed Sum of Absolute Differences arrays previously computed, assigning a motion for the region according to a candidate and removing the neighboring region from a region list. In addition to the Sum of Absolute Differences, a spatial smoothness term and a penalty value are used. The system further comprises one or more modules for using global motion, spatial neighbor candidates and/or temporal neighbor candidates to assist in the motion estimation.

In another aspect, a device for estimating motion in a video comprises a memory for storing an application, the application for performing phase correlation on the video to identify local motion candidates and merging regions of the video to generate motion segmentation and a processing component coupled to the memory, the processing component configured for processing the application.

In another aspect, a camcorder device comprises a video acquisition component for acquiring a video, an encoder for encoding the image, including motion estimation, by performing phase correlation on the video to identify local motion candidates and merging regions of the video while performing the phase correlation to generate motion segmentation and a memory for storing the encoded video.

DETAILED DESCRIPTION OF THE PREFERRED EMBODIMENT

Motion estimation is performed with phase correlation while simultaneously performing a low-level motion segmentation as described herein. Phase correlation is used to identify local motion candidates and apply region merging on small sub-blocks to generate the low-level motion segmentation. Performing motion estimation and segmentation simultaneously avoids the limitations of performing them independently. Further, phase correlation and region growing are performed in combination.

Local Motion Estimation
Motion Candidates by Phase Correlation

Figure 1:
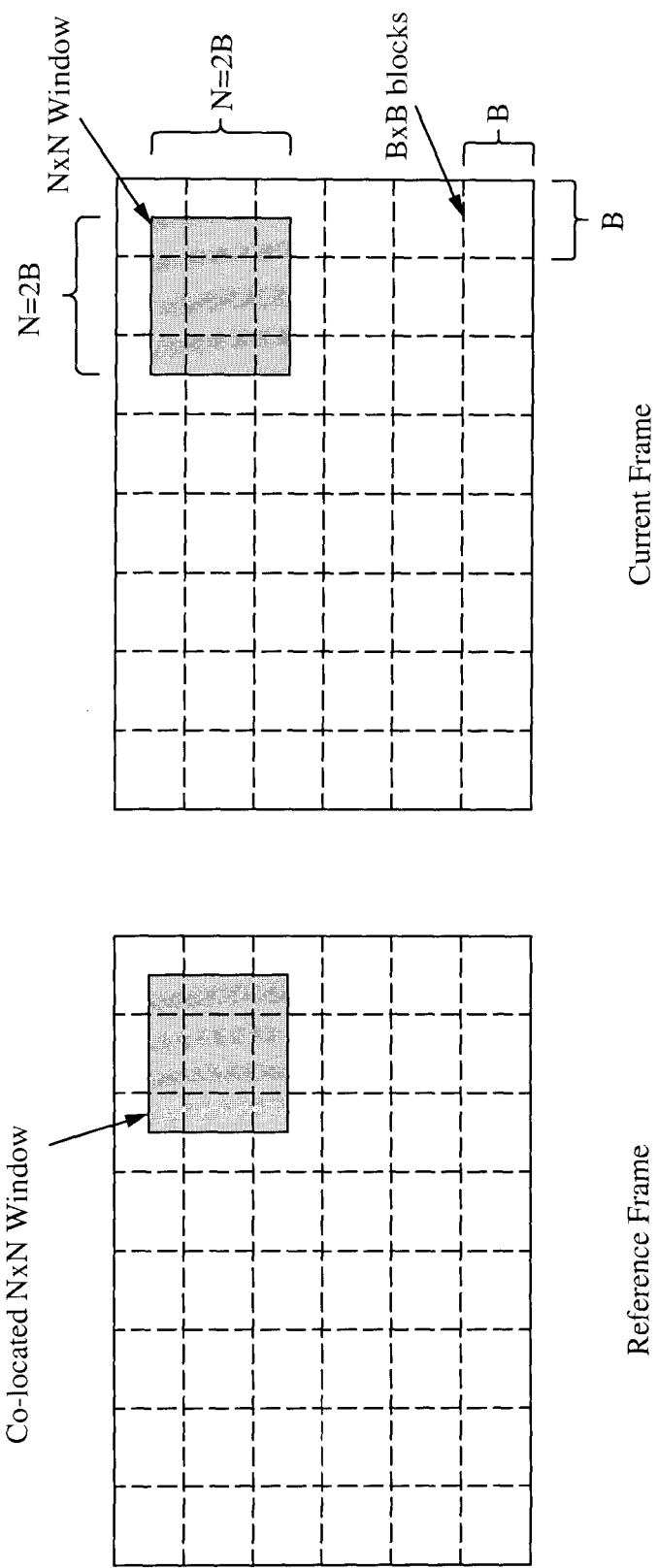
FIG. 1 illustrates an example of co-located blocks according to some embodiments.

Local motion analysis is performed on each B×B block in a video frame. Phase correlation estimates motion by considering a window that surrounds the B×B block. A surrounding window size of N×N is used, where N=2B. In some embodiments, another window size is used. Phase correlation considers an N×N window in both the current frame and the reference frame, where the windows are able to be co-located or, in a more general case, an offset is able to be present for the block in the reference frame due to a motion predictor. FIG. 1 illustrates an example of co-located blocks according to some embodiments.

Figure 2:
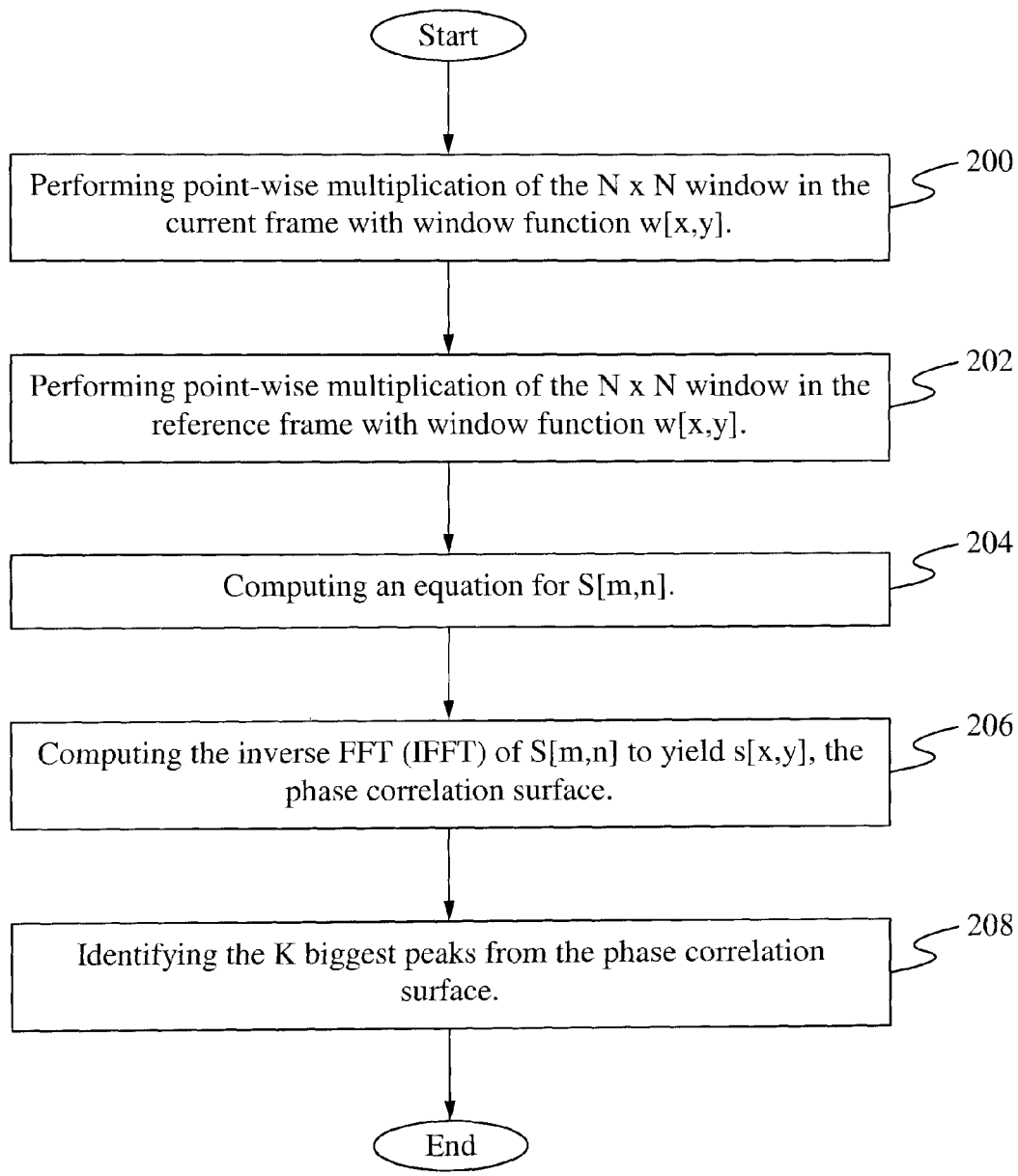
FIG. 2 illustrates a flowchart of phase correlation according to some embodiments.

FIG. 2 illustrates a flowchart of phase correlation according to some embodiments. In the step 200, point-wise multiplication of the N×N window in the current frame with window function w[x,y] is performed. A Fast Fourier Transform (FFT) is applied to the result, which yields the complex values G[m,n]. In the step 202, point-wise multiplication of the N×N window in the reference frame is performed with the window function w[x,y]. FFT is applied to the result, which yields the complex values F[m,n]. In the step 204, the following equation is computed:

$$S[m, n] = \frac{F[m, n]G^*[m, n]}{|F[m, n]G^*[m, n]|},$$

where * denotes the complex conjugate, and | | represents the magnitude of the complex argument. In the step 206, the inverse FFT (IFFT) of S[m,n] is computed to yield s[x,y], the phase correlation surface. In the step 208, the K biggest peaks are identified from the phase correlation surface. The indices of these peaks correspond to possible motions that are present between the N×N windows in the current and reference frames.

For the window function, a 2-D separable extension of the Hamming window is used whose 1-D definition is $$w[x] = 0.53836 - 0.46164\cos\left(\frac{2\pi x}{N-1}\right).$$

Other implementations are able to be used as well, such as a Hann window, a Blackman window, a Bartlett window or any other window.

The peaks in the correlation surface represent possible motions. Larger peaks indicate higher correlation, and the largest peak often indicates the dominant motion in the N×N window. However, due to the nature of phase correlation (and the Fourier Transform), it is not possible to know which motions correspond to which parts of the B×B block. To resolve the ambiguity, further processing is used.

To estimate motion within the B×B block, the B×B block is decomposed into smaller 4×4 sub-blocks. In some embodiments, other sub-block sizes are used. K phase correlation candidates are denoted as:

cand$_i$=($\Delta x_i, \Delta y_i$), $i$=0, . . . , $K$−1.

For each 4×4 sub-block, the Sum of Absolute Differences (SAD) is computed for each candidate. In some embodiments, another matching criterion is used.

Region Merging for Final Motion Estimates

Figure 3:
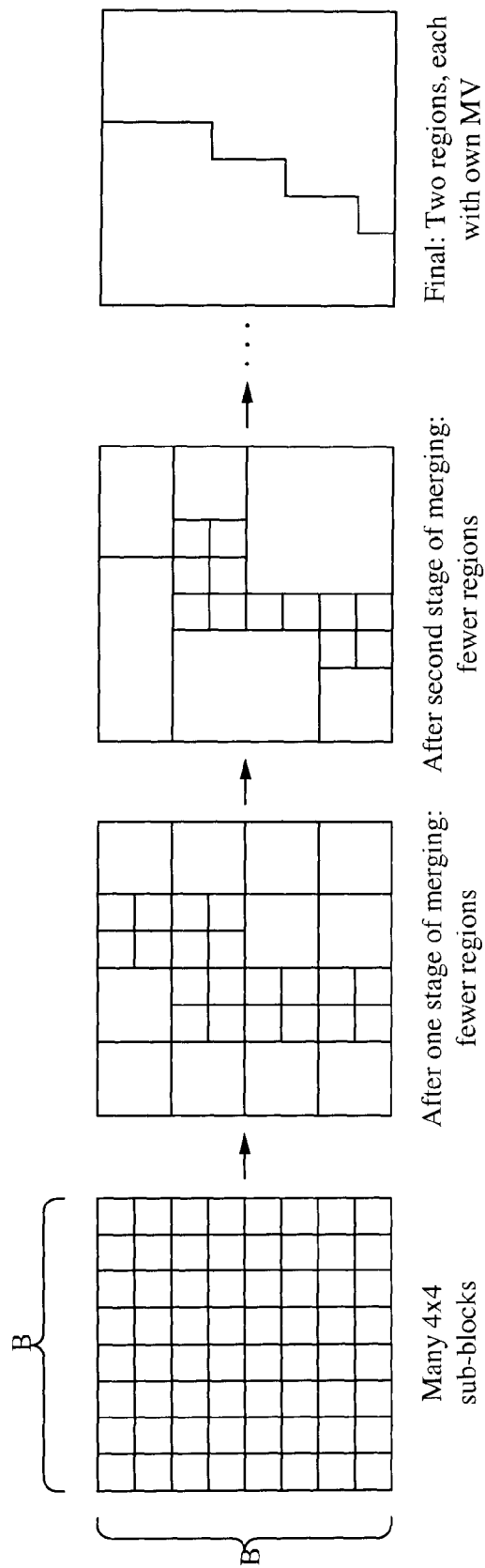
FIG. 3 shows a simplified representation of region merging according to some embodiments.

Each 4×4 sub-block is considered a distinct region within the larger B×B block. It is unlikely that the content actually includes so many small regions with independent motions. Rather, it is more likely that the B×B block has at most a few regions that are moving independently. For this reason, the 4×4 sub-blocks are merged into regions, where each region has its own distinct motion. FIG. 3 shows a simplified representation of region merging according to some embodiments.

Figure 4:
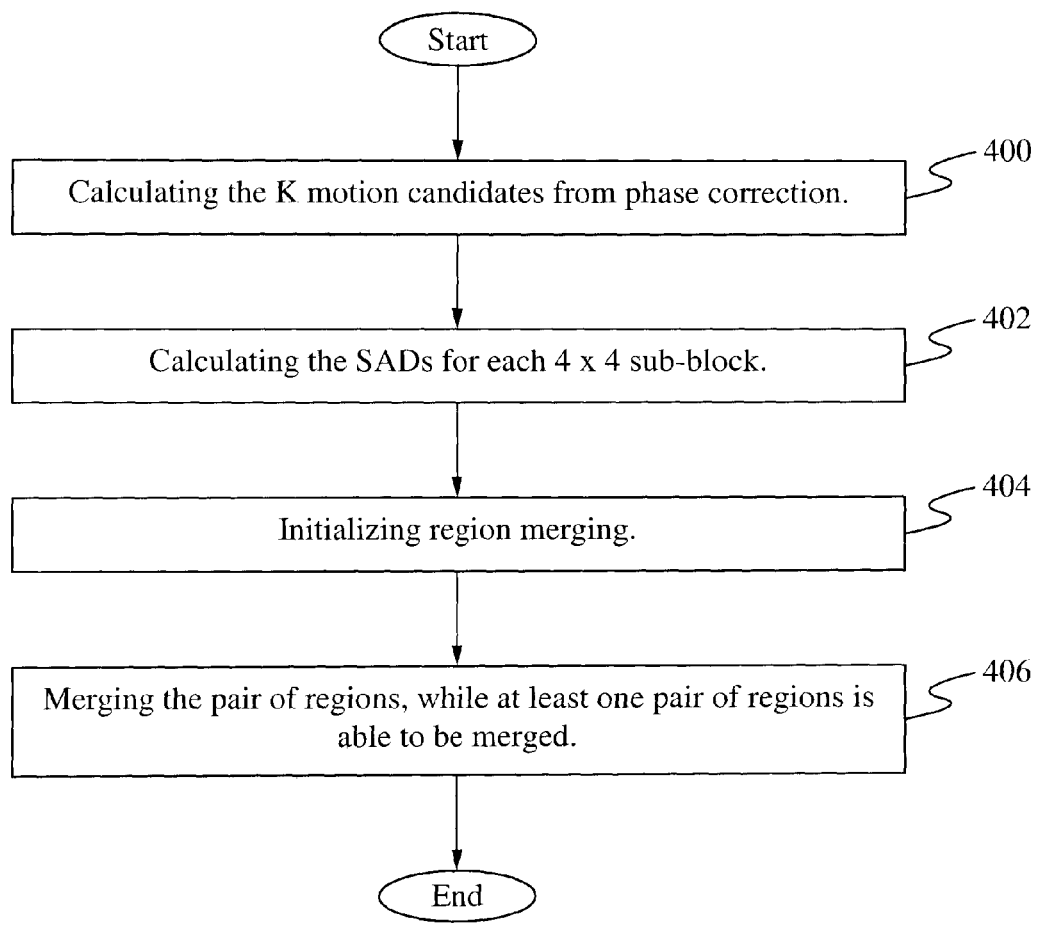
FIG. 4 illustrates a flowchart of a method of region merging according to some embodiments.

FIG. 4 illustrates a flowchart of a method of region merging according to some embodiments. In the step 400, the K motion candidates are calculated from phase correlation. In the step 402, the SADs for each 4×4 sub-block are calculated (optionally including chroma components for improved performance). Thus, each 4×4 sub-block has an array of SAD values, where the array is indexed according to a motion candidate. In the step 404, region merging initialization occurs. A linked list of regions is generated, with each 4×4 sub-block assigned to one region. Each region maintains an SAD array for the motion candidates. The SAD array is set for each region in the list according to the SADs of each 4×4 sub-block. The motion vector of each region in the list is assigned according to the smallest SAD in that region's SAD array. The area of each region is assigned to be 1, meaning that each region initially includes a single 4×4 sub-block.

In the step 406, while at least one pair of regions is able to be merged, merging occurs. For each region, $R_i$, in the list of regions and for each neighbor region, $R_j$, of region, $R_i$, it is determined if the two are able to be merged to form a single region. A new SAD array is computed by summing the SAD arrays of the two regions $R_j$ and $R_i$. The new SAD array represents the SAD array of the union of regions $R_j$ and $R_i$. The minimum SAD is found from the SAD array computed, and it is denoted as $SAD_{i \cup j}$, with the candidate index denoted as k. $SAD_i$ and $SAD_j$ are denoted as the best current SADs of regions $R_i$ and $R_j$. If $SAD_{i \cup j} < SAD_i + SAD_j + T$, the regions $R_i$ and $R_j$ are merged. The area from region, $R_j$, is added to the area for region $R_i$. The SAD array of $R_i$ is assigned according to the summed SAD arrays previously computed. The motion for Region $R_i$ is assigned according to the candidate k. The region $R_j$ is removed from the region list.

By construction, it is always true that $SAD_{i \cup j} \geq SAD_i + SAD_j$. The parameter T in the above algorithm allows two regions to be merged even though the SAD of the merged region is not better than the SADs of the individual regions. A small T discourages region merging, while a large T encourages region merging. Proper choice of T is important for proper algorithm behavior. T is assigned to be dependent on the area of the two regions, $R_i$ and $R_j$, that are being considered for merging, as follows:

$$T = \rho \mathrm{MIN}(\text{area of } R_i, \text{area of } R_j).$$

This threshold T thus depends on characteristics of both regions $R_i$ and $R_j$. In some embodiments, T is selected using a different method.

Encouraging Motion Consistency Across B×B Blocks

Figure 5:
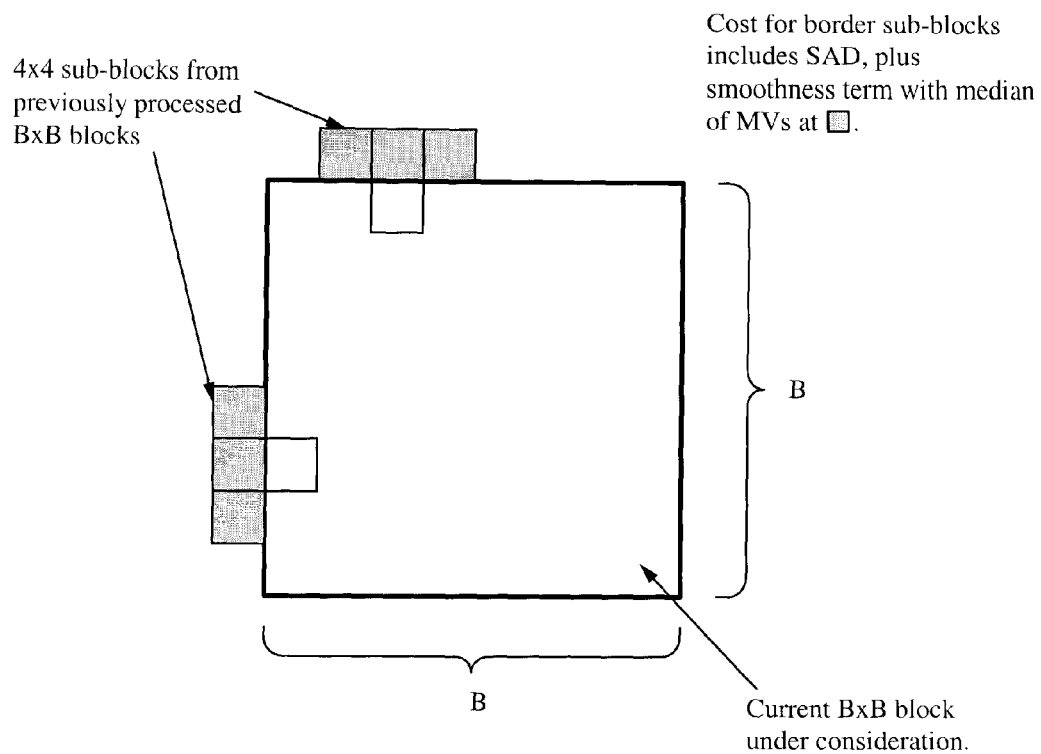
FIG. 5 shows spatial relationships according to some embodiments.

To encourage consistency of motion across B×B block boundaries, the above procedure is able to be modified slightly. For the 4×4 sub-blocks on the left and top borders of the B×B blocks, a more generic function is able to be used instead of the SAD. The cost function is:

$$\mathrm{COST} = \alpha(\text{SPATIAL SMOOTHNESS TERM}) + \mathrm{SAD},$$

where the "SPATIAL SMOOTHNESS TERM" includes a difference between the 4×4 sub-block motion candidate, and a motion predictor from the adjacent sub-blocks in the neighboring B×B block. Further, α controls the strength of the spatial-smoothness penalty term. The left and top borders are considered because B×B blocks in those directions already have motion estimates from previous processing since blocks are processed row by row, from left to right and top to bottom. A different order for block processing would cause different borders to be used. Adding the cost term encourages spatial smoothness across B×B block boundaries. FIG. 5 shows the spatial relationships according to some embodiments.

Supplemental Motion Candidates

Figure 6:
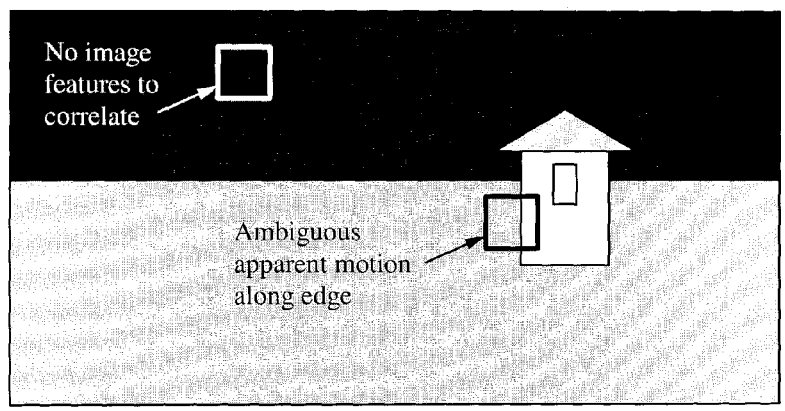
FIG. 6 illustrates examples of candidates that are difficult to identify according to some embodiments.

Phase correction usually does a good job of identifying candidate motions for image blocks. However, as with all local motion estimators, when there are no unique image features in the window, good candidates are not able to be identified. One example situation is for a window corresponding to the sky; the smooth image content has no features that are able to be correlated in the two windows, and no candidates are able to be identified. Similarly, windows on object edges are able to have multiple motions along the edge with similar correlation, and the true motions are difficult to identify. FIG. 6 illustrates examples of candidates that are difficult to identify according to some embodiments.

When phase correlation is not able to identify the true motion, additional candidates are used. The phase correlation candidates are able to be supplemented with the following additional candidates.

Global Motion Candidates

Figure 7:
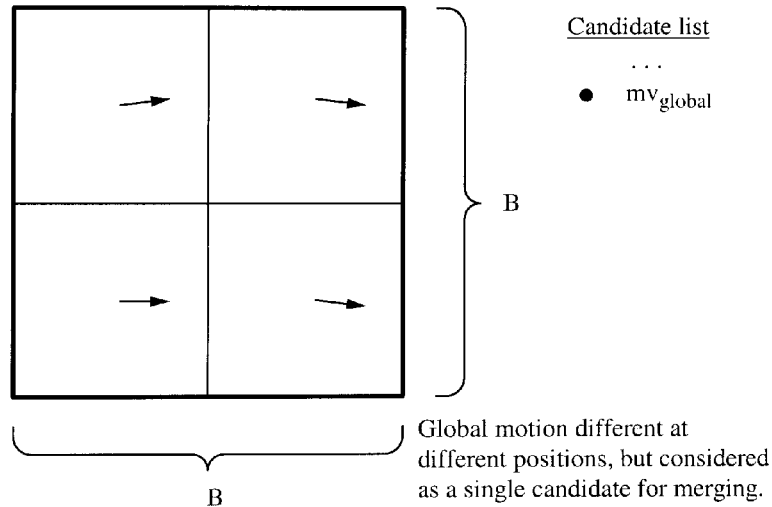
FIG. 7 demonstrates a global motion candidate, and how it is able to vary according to position according to some embodiments.

A single candidate that corresponds to the global motion (which has been previously computed) is added. Global motion is in general non-translational (for example, rotation), but it is able to be approximated locally as simple block translation. The global motion candidate is able to be treated specially. Although it is considered as a single candidate, it is able to be different at different locations within the B×B block. Thus, each sub-block within the B×B block has a single candidate labeled as "global motion candidate," although the actual motion for that candidate is able to vary according to position. FIG. 7 demonstrates the global motion candidate, and how it is able to vary according to position according to some embodiments.

Spatial Neighbor Candidates

Figure 8:
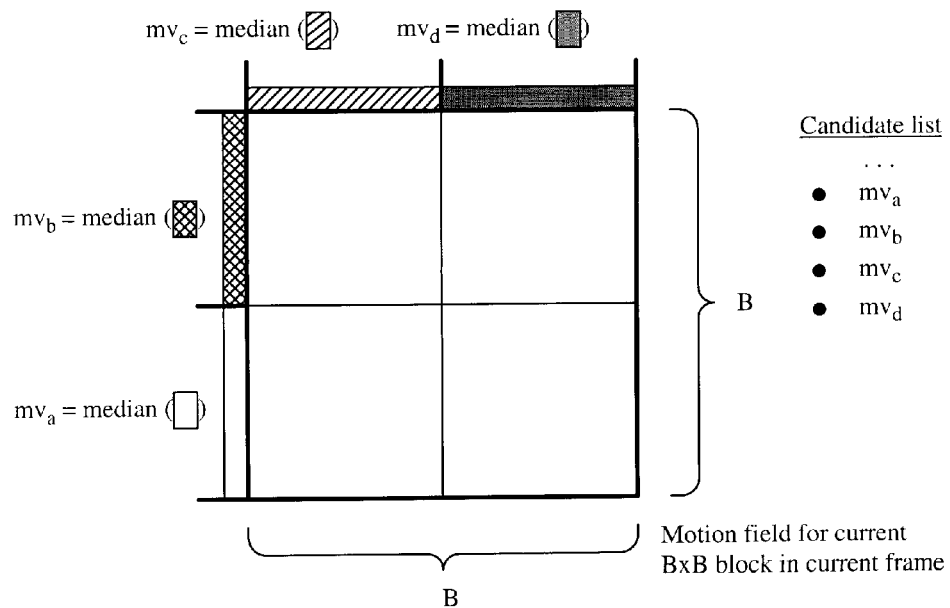
FIG. 8 demonstrates spatial neighbor candidates according to some embodiments.

Four candidates are able to be added from spatially neighboring blocks that were previously processed. Two candidates from the B×B block to the left of the current block and two candidates from the B×B block above the current block are used. To determine the candidate, the median of the motion vectors along the shared borders are taken. In some embodiments, another measure such as the mean of the motion vectors is taken. FIG. 8 demonstrates the spatial neighbor candidates according to some embodiments.

Temporal Neighbor Candidates

Figure 9:
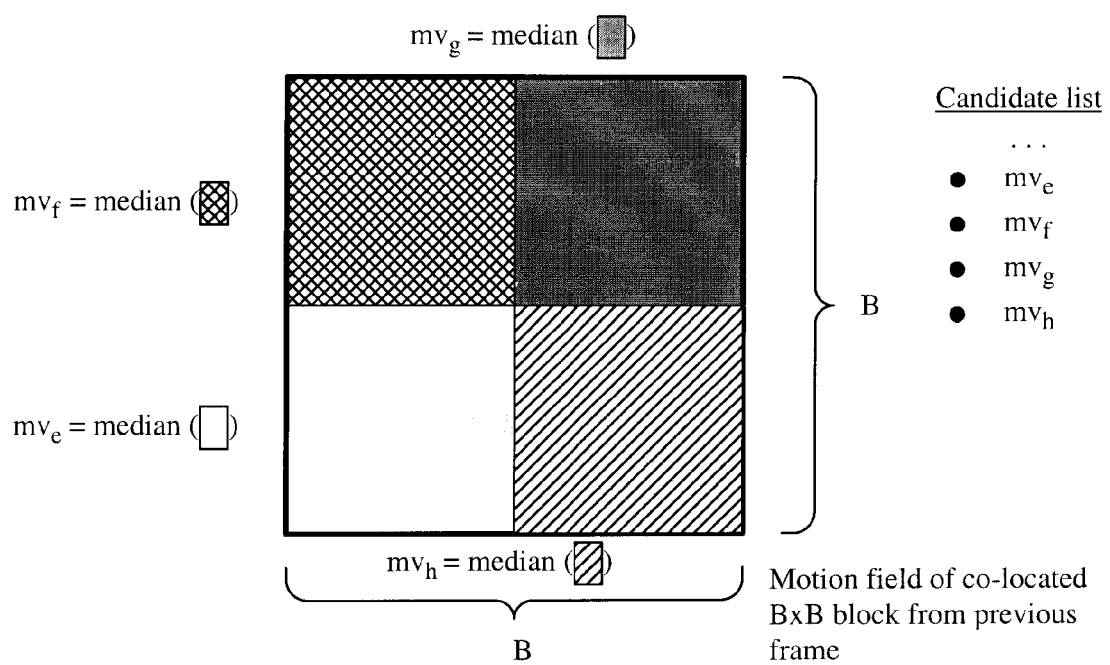
FIG. 9 illustrates temporal candidates according to some embodiments.

Four temporal candidates from co-located B×B blocks in the previous frame's motion vector field and one candidate from each of the four quadrants are able to be added. From each of the B×B block's quadrants, the median motion vector is computed and is added to the list of motion candidates. If the median is considered too complex, a simpler alternative is able to be used, such as the mean. FIG. 9 illustrates the temporal candidates according to some embodiments.

Figure 10:
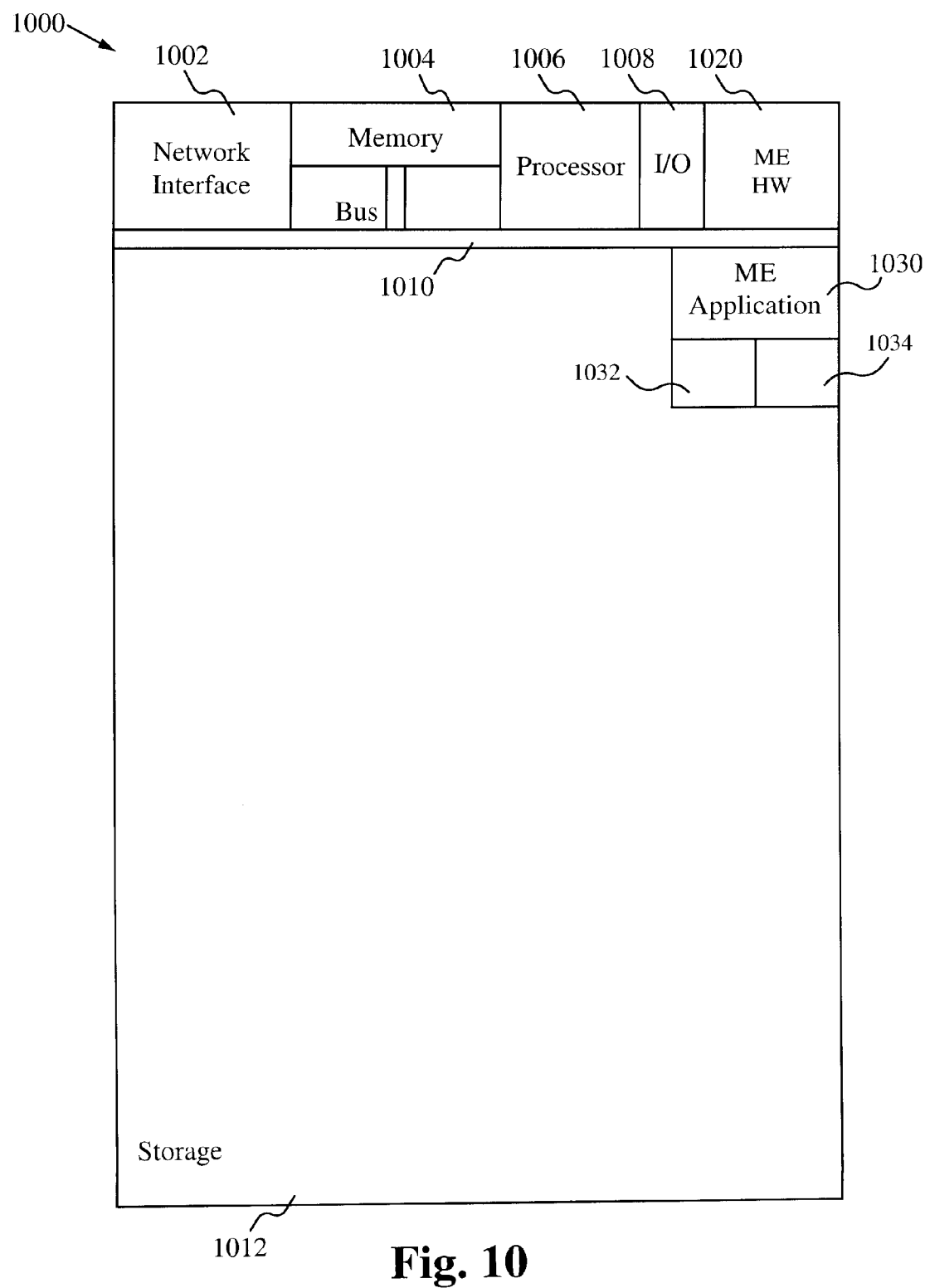
FIG. 10 illustrates a block diagram of an exemplary computing device configured to implement the method to estimate segmented motion according to some embodiments.

FIG. 10 illustrates a block diagram of an exemplary computing device 1000 configured to implement the method to estimate segmented motion according to some embodiments. The computing device 1000 is able to be used to acquire, store, compute, communicate and/or display information such as images and videos. For example, a computing device 1000 is able to acquire and store a video. The method to estimate segmented motion is able to be used when encoding a video on the device 1000. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. The memory 1004 is able to be any conventional computer memory known in the art. The storage device 1012 is able to include a hard drive, CDROM, CDRW, DVD, DVDRW, flash memory card or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, display, printer, modem, touchscreen, button interface and other devices. Motion estimation application(s) 1030 used to perform the method to estimate segmented motion are likely to be stored in the storage device 1012 and memory 1004 and processed as applications are typically processed. More or less components than shown in FIG. 10 are able to be included in the computing device 1000. In some embodiments, motion estimation hardware 1020 is included. Although the computing device 1000 in FIG. 10 includes applications 1030 and hardware 1020 for motion estimation, the method to estimate segmented motion is able to be implemented on a computing device in hardware, firmware, software or any combination thereof.

In some embodiments, the motion estimation application(s) 1030 include several applications and/or modules. In some embodiments, the motion estimation application(s) 1030 include a phase correlation module 1032 and a region merging module 1034. The phase correlation module 1032 performs phase correlation as described herein. The region merging module 1034 performs region merging as described herein. In some embodiments, the phase correlation module 1032 and the region module 1034 are executed simultaneously. In some embodiments, one or more modules are utilized for using global motion, spatial neighbor candidates and/or temporal neighbor candidates to assist in the motion estimation. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a television, a home entertainment system or any other suitable computing device.

To utilize the method to estimate segmented motion, a user displays a video such as on a digital camcorder, and while the video is displayed, the method to estimate segmented motion automatically performs the motion estimation and motion segmentation at the same time, so that the video is displayed smoothly. The method to estimate segmented motion occurs automatically without user involvement.

In operation, the method to estimate segmented motion performs estimation of motion between one video frame and another while simultaneously performing a low-level motion segmentation which avoids the limitations of performing them independently. Phase correlation, which robustly identifies good candidate motions, and region growing, which incorporates optimal matching criteria while grouping local image regions, are also combined. Potential application areas for estimating segmented motion include, but are not limited to, video compression, video surveillance, detecting moving objects, tracking moving objects, various video filtering applications such as super-resolution, frame-rate conversion or de-interlacing.

Some Embodiments of Estimating Segmented Motion

1. A method of estimating motion in a video on a device comprising:
   a. performing phase correlation on the video to identify local motion candidates using a processor; and
   b. merging regions of the video to generate motion segmentation using the processor.
2. The method of clause 1 wherein performing the phase correlation further comprises:
   a. computing a phase correlation surface; and
   b. identifying biggest peaks from the phase correlation surface, wherein indices of the peaks correspond to possible motions.
3. The method of clause 1 wherein merging regions further comprises:
   a. assigning the local motion candidates according to results from the phase correlation;
   b. calculating a set of Sum of Absolute Differences for each sub-block of blocks of the video, including chroma components;
   c. initializing region merging; and
   d. merging regions until there are no regions to be merged.
4. The method of clause 3 wherein the set of Sum of Absolute Differences are stored in an array.
5. The method of clause 3 wherein initializing region merging further comprises:
   a. generating a linked list of the regions with each sub-block assigned to a region of the regions;
   b. maintaining a Sum of Absolute Differences array for each of the regions;
   c. assigning a motion vector of each of the regions in the linked list according to a smallest Sum of Absolute Differences in the region's Sum of Absolute Differences array; and
   d. assigning an area of each region to be a value representing a single sub-block.
6. The method of clause 3 wherein merging regions further comprises for each region in the regions and for each neighboring region, determining if the region and the neighboring region are able to be merged to form a single region.
7. The method of clause 6 wherein determining if the region and the neighboring region are able to be merged further comprises:
   a. computing a combined Sum of Absolute Differences array by summing the Sum of Absolute Differences arrays of the region and the neighboring region;
   b. determining a minimum Sum of Absolute Differences in the combined Sum of Absolute Differences array; and
   c. if the minimum Sum of Absolute Differences is less than a first minimum of the Sum of Absolute Differences of the region, a second minimum of the Sum of Absolute Differences of the neighboring region, and a parameter combined, then merge the region and the neighboring region.
8. The method of clause 7 wherein merging the region and the neighboring region comprises:
   a. adding the neighboring region to the region;
   b. assigning the Sum of Absolute Differences array according to the summed Sum of Absolute Differences arrays previously computed;
   c. assigning a motion for the region according to a candidate; and
   d. removing the neighboring region from a region list.

9. The method of clause 3 wherein in addition to the Sum of Absolute Differences, a spatial smoothness term and a penalty value are used.
10. The method of clause 1 further comprising using global motion candidates to assist in the motion estimation.
11. The method of clause 1 further comprising using spatial neighbor candidates to assist in the motion estimation.
12. The method of clause 1 further comprising using temporal neighbor candidates to assist in the motion estimation.
13. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.
14. A system for estimating motion in a video on a device comprising:
    a. a phase correlation module for performing phase correlation on the video to identify local motion candidates using a processor; and
    b. a region merging module for merging regions of the video to generate motion segmentation using the processor.
15. The system of clause 14 wherein the phase correlation module is further for:
    a. computing a phase correlation surface; and
    b. identifying biggest peaks from the phase correlation surface, wherein indices of the peaks correspond to possible motions.
16. The system of clause 14 wherein the region merging module is further for:
    a. assigning the local motion candidates according to results from the phase correlation;
    b. calculating a set of Sum of Absolute Differences for each sub-block of blocks of the video, including chroma components;
    c. initializing region merging; and
    d. merging regions until there are no regions to be merged.
17. The system of clause 16 wherein the set of Sum of Absolute Differences are stored in an array.
18. The system of clause 16 wherein initializing region merging further comprises:
    a. generating a linked list of the regions with each sub-block assigned to a region of the regions;
    b. maintaining a Sum of Absolute Differences array for each of the regions;
    c. assigning a motion vector of each of the regions in the linked list according to a smallest Sum of Absolute Differences in the region's Sum of Absolute Differences array; and
    d. assigning an area of each region to be a value representing a single sub-block.
19. The system of clause 16 wherein merging regions further comprises for each region in the regions and for each neighboring region, determining if the region and the neighboring region are able to be merged to form a single region.
20. The system of clause 19 wherein determining if the region and the neighboring region are able to be merged further comprises:
    a. computing a combined Sum of Absolute Differences array by summing the Sum of Absolute Differences arrays of the region and the neighboring region;
    b. determining a minimum Sum of Absolute Differences in the combined Sum of Absolute Differences array; and
    c. if the minimum Sum of Absolute Differences is less than a first minimum of the Sum of Absolute Differences of the region, a second minimum of the Sum of Absolute Differences of the neighboring region, and a parameter combined, then merge the region and the neighboring region.
21. The system of clause 20 wherein merging the region and the neighboring region comprises:
    a. adding the neighboring region to the region;
    b. assigning the Sum of Absolute Differences array according to the summed Sum of Absolute Differences arrays previously computed;
    c. assigning a motion for the region according to a candidate; and
    d. removing the neighboring region from a region list.
22. The system of clause 16 wherein in addition to the Sum of Absolute Differences, a spatial smoothness term and a penalty value are used.
23. The system of clause 14 further comprising one or more modules for using global motion, spatial neighbor candidates and/or temporal neighbor candidates to assist in the motion estimation.
24. A device for estimating motion in a video comprising:
    a. a memory for storing an application, the application for:
        i. performing phase correlation on the video to identify local motion candidates; and
        ii. merging regions of the video to generate motion segmentation; and
    b. a processing component coupled to the memory, the processing component configured for processing the application.
25. A camcorder device comprising:
    a. a video acquisition component for acquiring a video;
    b. an encoder for encoding the image, including motion estimation, by:
        i. performing phase correlation on the video to identify local motion candidates; and
        ii. merging regions of the video while performing the phase correlation to generate motion segmentation; and
    c. a memory for storing the encoded video.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of estimating motion in a video on a device comprising:
    a. performing phase correlation on the video to identify local motion candidates using a processor; and
    b. merging regions of the video to generate motion segmentation using the processor, wherein merging the regions comprises:
        i. assigning the local motion candidates according to results from the phase correlation;
        ii. calculating a set of Sum of Absolute Differences for each sub-block of blocks of the video, including chroma components;
        iii. initializing region merging; and
        iv. merging the regions until there are no regions to be merged.

2. The method of claim 1 wherein performing the phase correlation further comprises:
   a. computing a phase correlation surface; and
   b. identifying biggest peaks from the phase correlation surface, wherein indices of the peaks correspond to possible motions.

3. The method of claim 1 wherein the set of Sum of Absolute Differences are stored in an array.

4. The method of claim 1 wherein initializing region merging further comprises:
   a. generating a linked list of the regions with each sub-block assigned to a region of the regions;
   b. maintaining a Sum of Absolute Differences array for each of the regions;
   c. assigning a motion vector of each of the regions in the linked list according to a smallest Sum of Absolute Differences in the region's Sum of Absolute Differences array, and
   d. assigning an area of each region to be a value representing a single sub-block.

5. The method of claim 1 wherein merging regions further comprises for each region in the regions and for each neighboring region, determining if the region and the neighboring region are able to be merged to form a single region.

6. The method of claim 5 wherein determining if the region and the neighboring region are able to be merged further comprises:
   a. computing a combined Sum of Absolute Differences array by summing the Sum of Absolute Differences arrays of the region and the neighboring region;
   b. determining a minimum Sum of Absolute Differences in the combined Sum of Absolute Differences array; and
   c. if the minimum Sum of Absolute Differences is less than a first minimum of the Sum of Absolute Differences of the region, a second minimum of the Sum of Absolute Differences of the neighboring region, and a parameter combined, then merge the region and the neighboring region.

7. The method of claim 6 wherein merging the region and the neighboring region comprises:
   a. adding the neighboring region to the region;
   b. assigning the Sum of Absolute Differences array according to the summed Sum of Absolute Differences arrays previously computed;
   c. assigning a motion for the region according to a candidate; and
   d. removing the neighboring region from a region list.

8. The method of claim 1 wherein in addition to the Sum of Absolute Differences, a spatial smoothness term and a penalty value are used.

9. The method of claim 1 further comprising using global motion candidates to assist in the motion estimation.

10. The method of claim 1 further comprising using spatial neighbor candidates to assist in the motion estimation.

11. The method of claim 1 further comprising using temporal neighbor candidates to assist in the motion estimation.

12. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

13. A system for estimating motion in a video on a device comprising:
   a. a phase correlation module for performing phase correlation on the video to identify local motion candidates using a processor; and
   b. a region merging module for merging regions of the video to generate motion segmentation using the processor, wherein the region merging module is further for:
      i. assigning the local motion candidates according to results from the phase correlation;
      ii. calculating a set of Sum of Absolute Differences for each sub-block of blocks of the video, including chroma components;
      iii. initializing region merging; and
      iv. merging the regions until there are no regions to be merged.

14. The system of claim 13 wherein the phase correlation module is further for:
   a. computing a phase correlation surface; and
   b. identifying biggest peaks from the phase correlation surface, wherein indices of the peaks correspond to possible motions.

15. The system of claim 13 wherein the set of Sum of Absolute Differences are stored in an array.

16. The system of claim 13 wherein initializing region merging further comprises:
   a. generating a linked list of the regions with each sub-block assigned to a region of the regions;
   b. maintaining a Sum of Absolute Differences array for each of the regions;
   c. assigning a motion vector of each of the regions in the linked list according to a smallest Sum of Absolute Differences in the region's Sum of Absolute Differences array; and
   d. assigning an area of each region to be a value representing a single sub-block.

17. The system of claim 13 wherein merging regions further comprises for each region in the regions and for each neighboring region, determining if the region and the neighboring region are able to be merged to form a single region.

18. The system of claim 17 wherein determining if the region and the neighboring region are able to be merged further comprises:
   a. computing a combined Sum of Absolute Differences array by summing the Sum of Absolute Differences arrays of the region and the neighboring region;
   b. determining a minimum Sum of Absolute Differences in the combined Sum of Absolute Differences array; and
   c. if the minimum Sum of Absolute Differences is less than a first minimum of the Sum of Absolute Differences of the region, a second minimum of the Sum of Absolute Differences of the neighboring region, and a parameter combined, then merge the region and the neighboring region.

19. The system of claim 18 wherein merging the region and the neighboring region comprises:
   a. adding the neighboring region to the region;
   b. assigning the Sum of Absolute Differences array according to the summed Sum of Absolute Differences arrays previously computed;
   c. assigning a motion for the region according to a candidate; and
   d. removing the neighboring region from a region list.

20. The system of claim 13 wherein in addition to the Sum of Absolute Differences, a spatial smoothness term and a penalty value are used.

21. The system of claim 13 further comprising one or more modules for using global motion, spatial neighbor candidates and/or temporal neighbor candidates to assist in the motion estimation.

22. A device for estimating motion in a video comprising:
 a. a memory for storing an application, the application for:
  i. performing phase correlation on the video to identify local motion candidates; and
  ii. merging regions of the video to generate motion segmentation, wherein merging the regions comprises:
   (1) assigning the local motion candidates according to results from the phase correlation;
   (2) calculating a set of Sum of Absolute Differences for each sub-block of blocks of the video, including chroma components;
   (3) initializing region merging comprising:
    (a) generating a linked list of the regions with each sub-block assigned to a region of the regions;
    (b) maintaining a Sum of Absolute Differences array for each of the regions;
    (c) assigning a motion vector of each of the regions in the linked list according to a smallest Sum of Absolute Differences in the region's Sum of Absolute Differences array; and
    (d) assigning an area of each region to be a value representing a single sub-block; and
   (4) merging the regions until there are no regions to be merged; and
 b. a processing component coupled to the memory, the processing component configured for processing the application.

23. A camcorder device comprising:
 a. a video acquisition component for acquiring a video;
 b. an encoder for encoding the image, including motion estimation, by:
  i. performing phase correlation on the video to identify local motion candidates; and
  ii. merging regions of the video while performing the phase correlation to generate motion segmentation, wherein merging the regions further comprises:
   A. assigning the local motion candidates according to results from the phase correlation;
   B. calculating a set of Sum of Absolute Differences for each sub-block of blocks of the video, including chroma components;
   C. initializing region merging; and
   D. merging the regions until there are no regions to be merged; and
 c. memory for storing the encoded video.

* * * * *